United States Patent
Sinha et al.

(10) Patent No.: US 11,480,479 B2
(45) Date of Patent: Oct. 25, 2022

(54) MICROSCALE THERMOCOUPLE PROBE FOR INTRACELLULAR TEMPERATURE MEASUREMENTS

(71) Applicant: The Board of Trustees of the University of Illinois, Urbana, IL (US)

(72) Inventors: Sanjiv Sinha, Champaign, IL (US); Manjunath C. Rajagopal, Champaign, IL (US)

(73) Assignee: THE BOARD OF TRUSTEES OF THE UNIVERSITY OF ILLINOIS, Urbana, IL (US)

( * ) Notice: Subject to any disclaimer, the term of this patent is extended or adjusted under 35 U.S.C. 154(b) by 346 days.

(21) Appl. No.: 16/775,450

(22) Filed: Jan. 29, 2020

(65) Prior Publication Data

US 2020/0249103 A1    Aug. 6, 2020

Related U.S. Application Data

(60) Provisional application No. 62/800,795, filed on Feb. 4, 2019.

(51) Int. Cl.
| | | |
|---|---|---|
| *G01K 13/00* | (2021.01) | |
| *G01K 15/00* | (2006.01) | |
| *G01K 7/02* | (2021.01) | |

(52) U.S. Cl.
CPC ........... *G01K 15/005* (2013.01); *G01K 7/028* (2013.01); *G01K 13/00* (2013.01)

(58) Field of Classification Search
CPC ........ G01Q 60/58; G01Q 70/12; G01Q 60/02; G01Q 60/54; G01Q 70/06; G01Q 70/10; G01Q 70/14; G01K 7/028; G01K 15/005; G01K 2211/00; G01K 7/02; G01K 15/00; G01K 7/06; G01K 13/00; G01K 17/006; G01K 7/186; G01K 7/08; G01K 7/226
USPC ...................... 374/179, 170, 178, 1
See application file for complete search history.

(56) References Cited

U.S. PATENT DOCUMENTS

| | | | |
|---|---|---|---|
| 4,136,683 A | | 1/1979 | Gordon |
| 4,664,110 A | * | 5/1987 | Schanzlin ............... A01N 1/02 |
| | | | 606/20 |
| 5,356,218 A | * | 10/1994 | Hopson .................. G01Q 60/02 |
| | | | 356/613 |

(Continued)

FOREIGN PATENT DOCUMENTS

| | | | |
|---|---|---|---|
| CA | 2682211 A1 | * 9/2008 | ............. B01L 99/00 |
| CN | 102419217 A | 8/2011 | |

(Continued)

OTHER PUBLICATIONS

"Micro-thermocouple probe for measurement of cellular thermal responses". Watabane et al. IEEE (Year: 2005).*

(Continued)

*Primary Examiner* — Gail Kaplan Verbitsky
(74) *Attorney, Agent, or Firm* — Crowell & Moring LLP

(57) ABSTRACT

A microscale thermocouple probe for intracellular temperature measurements comprises a cantilever structure including a suspended portion extending from a support, where the suspended portion includes first and second conductive lines on a surface thereof. The first and second conductive lines extend along the surface and meet at a tip of the suspended portion to define a thermocouple junction.

20 Claims, 5 Drawing Sheets

(56) References Cited

U.S. PATENT DOCUMENTS

| | | | |
|---|---|---|---|
| 5,441,343 A | 8/1995 | Pylkki et al. | |
| 5,838,005 A | 11/1998 | Majumdar et al. | |
| 5,929,438 A * | 7/1999 | Suzuki | G01Q 60/58 977/867 |
| 5,969,238 A * | 10/1999 | Fischer | G01Q 60/58 977/875 |
| 7,073,938 B2 * | 7/2006 | Gianchandani | G01K 7/186 374/185 |
| 7,282,712 B2 * | 10/2007 | Shibayama | G01J 5/12 250/338.4 |
| 2003/0081651 A1 * | 5/2003 | Gianchandani | G01K 7/028 374/185 |
| 2012/0054924 A1 * | 3/2012 | Zhang | G01Q 60/22 850/56 |
| 2012/0118060 A1 * | 5/2012 | Kimura | G01L 21/14 73/384 |

FOREIGN PATENT DOCUMENTS

| | | | | |
|---|---|---|---|---|
| CN | 102575996 A | * | 7/2012 | G01N 29/036 |
| CN | 103940528 A | | 4/2014 | |
| CN | 104965069 A | * | 10/2015 | |
| CN | 205035373 U | * | 2/2016 | |
| CN | 106033087 B | * | 5/2018 | |
| EP | 1990626 A1 | * | 11/2008 | B82Y 35/00 |
| EP | 190626 | * | 8/2011 | |
| JP | H09196940 A | * | 7/1997 | |
| JP | H1194863 A | * | 4/1999 | |
| JP | 2007-86079 A | * | 1/2001 | |
| JP | 2001004455 A | * | 1/2001 | |
| JP | 2003/279421 A | | 3/2002 | |
| JP | 3828030 B2 | * | 9/2006 | G01K 1/18 |
| JP | 2011242287 A | * | 12/2011 | B82Y 35/00 |
| JP | 2017533572 A | * | 11/2017 | |
| KR | 2017119029 A | * | 10/2017 | G01N 33/4833 |
| WO | WO-2005069802 A2 | * | 8/2005 | B82Y 35/00 |
| WO | WO2008112713 A1 | * | 9/2008 | |
| WO | WO-2010012423 A1 | * | 2/2010 | B01L 3/0244 |

OTHER PUBLICATIONS

U. Acharya, et al., "Thermography Based Breast Cancer Detection Using Texture Features and Support Vector Machine," *Journal of Medical Systems*, 36 (3) (2012), pp. 1503-1510.

G. Baffou, H. Rigneault, D. Marguet, L. Jullien, "A Critique of Methods for Temperature Imaging in Single Cells," *Nature Methods*, vol. 11, No. 9, Sep. 2014, pp. 899-901.

M. Chertok, et al., "Thermal and Tensile Strength Testing of Thermally-Conductive Adhesives and Carbon Foam," *J. Instrum.*, 12, P01010 (2017) pp. 1-11.

Cheung, K.C., "Implantable microscale neural interfaces," *Biomed Microdevices*, 9 (2007) pp. 923-938. (Abstract only).

E. Cianci, et al., "Young's Modulus and Residual Stress of DF PECVD Silicon Nitride for MEMS Free-Standing Membranes," *Microelectronic Engineering*, 84 (5) (2007) pp. 1296-1299.

D. Denlinger, et al., "Thin Film Microcalorimeter for Heat Capacity Measurements from 1.5 to 800 K," *Review of Scientific Instruments*, 65 (1994) pp. 946-959.

J. Donner, et al., "Mapping Intracellular Temperature Using Green Fluorescent Protein," *Nano Letters*, 12 (2012) pp. 2107-2111.

G. Fish, et al., "Ultrafast Response Micropipette-Based Submicrometer Thermocouple," *Review of Scientific Instruments*, 66 (1995) pp. 3300-3306.

C. Guy, et al., "Metabolomics of Temperature Stress," *Physiologia Plantarum*, 132 (2008) pp. 220-235.

A. Helmy, et al., "Application of Thermography for Non-Invasive Diagnosis of Thyroid Gland Disease," *IEEE Transactions on Biomedical Engineering*, 55 (3) (2008) pp. 1168-1175.

S. Herth, et al., "Thermomicrocapillaries as Temperature Biosensors in Single Cells," *Applied Physics Letters*, 102, 103505 (2013) pp. 1-6.

X. J. Hu, et al., "Investigation of the Natural Convection Boundary Condition in Microfabricated Structures," *International Journal of Thermal Sciences*, 47 (2008) pp. 820-824.

S. Huang, et al., "Measurement of the Thermal Transport Properties of Dielectric Thin Films Using the Micro-Raman Method," *J. Zhejiang Univ. Sci. A*, 10 (1) (2009) pp. 7-16.

T. Jeong, et al., "Thermal Boundary Resistance for Gold and CoFe Alloy on Silicon Nitride Films," *Journal Applied Physics*, 111, 083510 (2012) pp. 1-7.

K. Kim, et al., "Nanotopographical Imaging Using a Heated Atomic Force Microscope Cantilever Probe," *Sensors and Actuators A: Physical*, vol. 136, Issue 1, May 2007, pp. 95-103.

G. Langer, et al., "Thermal Conductivity of Thin Metallic Films Measured by Photothermal Profile Analysis," *Rev. Sci. Instrum.* 68 (3) (1997) pp. 1510-1513.

S.-M. Lee, et al., "Heat Transport in Thin Dielectric Films," *J. Appl. Phys.*, 81 (6) (1997) pp. 2590-2595.

B. Lowell, et al., "Towards a Molecular Understanding of Adaptive Thermogenesis," *Nature*, 404 (2000) pp. 652-660.

K. Najafi, et al., "A high-Yield IC-Compatible Multichannel Recording Array," *IEEE Transactions on Electron Devices*, vol. 32, No. 7, Jul. 1985, pp. 1206-1211.

K. Okabe, et al, Intracellular Temperature Mapping With a Fluorescent Polymeric Thermometer and Fluorescence lifetime imaging microscopy, *Nature Communications*, 3, 705 (2012) pp. 1-9.

P. Privalov, et al., "A Thermodynamic Approach to the Problem of Stabilization of Globular Protein Structure: A Calorimetric Study," *J. Mol. Biology*, 86 (1974) pp. 665-684.

A. Sharp, et al., "In Vivo Penetration Mechanics and Mechanical Properties of Mouse Brain Tissue at Micrometer Scales," *IEEE Trans. Biomed. Eng.*, 56 (1) pp. 45-53

L. Shi, O. Kwon, A. C. Miner and A. Majumdar, "Design and batch fabrication of probes for sub-100 nm scanning thermal microscopy," *Journal of Microelectromechanical Systems*, vol. 10, No. 3 (2001) pp. 370-378.

R. Shrestha, et al., "A High-Precision Micropipette Sensor for Cellular-Level Real-Time Thermal Characterization," *Sensors*, 11 (9) (2011) pp. 8826-8835.

G. Somero, "Proteins and Temperature," *Annual Review of Physiology*, 57 (1995) pp. 43-68.

L. Sonna, et al., "*Molecular Biology of Thermoregulation* Invited Review: Effects of Heat and Cold Stress on Mammalian Gene Expression," *J. Appl. Physiol*, 92 (2002) pp. 1725-1742.

G. Szakmany, et al., "Nanowire Thermocouple Characterization Platform," *IEEE Transactions on Nanotechnology*, 12 (3) (2013) pp. 309-313.

E. Tanaka, et al., "Microcalorimetric Measurements of Heat Production In Isolated Rat Brown Adipocytes," *Biochem. Int.*, 26 (5) (1992) (Abstract Only).

R. Tanimoto, et al., "Detection of Temperature Difference in Neuronal Cells," *Scientific Reports*, 6, 22071 (2016) pp. 1-10.

I. Tasaki, et al., "Heat Generated by the Dark-Adapted Squid Retina in Response to Light Pulses," *Science*, 227 (1985) pp. 654-656.

L. Tauc, "Site of Origin and Propagation of Spike in the Giant Neuron of Aplysia," *The Journal of General Physiology*, 45 (6) (1962) 1077-1097.

W. Tian, et al., "A High Precision Apparatus for Intracellular Thermal Response at Single-Cell Level," *Nanotechnology*, 26, 355501 (2015) pp. 1-9.

R. K. Ulrich, et al., "PECVD Silicon and Nitride Postbond Films for Protecting Bondpads, Bonds and Bondwires from Corrosion Failure," *Electronic Components and Technology Conference Proceedings*, 41st, IEEE (1991) 738-744.

C. Wang, et al., "Determining Intracellular Temperature at Single-Cell Level by a Novel Thermocouple Method," *Cell Research*, 21, 10, (2011) pp. 1517-1519.

M. S. Watanabe, "Micro-Thermocouple Probe for Measurement of Cellular Thermal Responses," *Engineering in Medicine and Biology 27th Annual Conference, Proceedings of the 2005 IEEE* (2005) pp. 4858-4861.

I. Watanabe, et al., "Effects of Temperature on Growth Rate of Cultured Mammalian Cells (L5178Y)," *The Journal of Cell Biology*, vol. 32 (1967) pp. 309-323.

(56) References Cited

OTHER PUBLICATIONS

G. S. Wilson, et al., "Biosensors for Real-Time In Vivo Measurements," *Biosensors & Bioelectronics*, 20 (2005) pp. 2388-2403.
F. Yu, "Design, Fabrication, and Characterization of Polymer-Based Cantilever Probes for Atomic Force Microscopes," *J. Vacuum Sci. Technol. B*, 34, 6 (2016) pp. 06KI01-1-06KI01-7.
Y. Zhao, et al., "Temperature Effects on Neuronal Membrane Potentials and Inward Currents in Rat Hypothalamic Tissue Slices," *J. Physiol.*, 564, 1 (2005) pp. 245-257.
B. Zink, et al., "Specific heat and thermal conductivity of low-stress amorphous Si—N membranes," *Solid State Communications*, 129 (3) (2004) pp. 199-204.

* cited by examiner

MICROSCALE THERMOCOUPLE PROBE FOR INTRACELLULAR TEMPERATURE MEASUREMENTS

RELATED APPLICATIONS

The present patent document claims the benefit of priority under 35 U.S.C. § 119(e) to U.S. Provisional Patent Application No. 62/800,795, filed on Feb. 4, 2019, and hereby incorporated by reference in its entirety.

FEDERALLY SPONSORED RESEARCH OR DEVELOPMENT

This invention was made with government support under grant numbers NSF-CBET-12-50192 and NSF-CBET-17-06854 awarded by the National Science Foundation. The government has certain rights in the invention.

TECHNICAL FIELD

The present disclosure is related generally to microscale temperature measurement, and more particularly to temperature measurement within biological cells.

BACKGROUND

Temperature is a fundamental thermodynamic property affecting every biochemical reaction in cellular environments. Living cells undergo temperature mediated activities such as cell division, gene expression, protein stabilization, and metabolism. Extracellular thermometry has been shown to be important in detecting cancer and thyroid related diseases, and for understanding multiple metabolic pathways. In comparison, thermometry at the subcellular level is relatively less explored. The dominant heat generation reactions inside a cell include the mitochondrial respiratory chain (non-shivering), and the reactions that consume ATP (shivering), both of which are the primary modes of thermal regulation in warm-blooded animals. Temperature gradients can be established within a cell by the reactions associated with multiple organelles in a cell. The nucleus, mitochondria, and centrosomes have been found to be at a temperature of 0.5-1° C. higher than cytoplasm. In addition to gradients, temperature transients also arise, for example, when a cell is subjected to external stimuli such as light, drugs, or during sudden neurophysiological activities in neuron cells. To understand the physiology of such reactions, there is a growing interest in the measurements of intracellular temperatures, especially in adipose tissues, muscles, and neurons. Since the cell wall and cytoplasm can mask the temperature fluctuations arising within the cell, an intracellular probe would be beneficial for such measurements. Existing non-invasive and invasive methods are plagued by shortcomings, such as inaccuracy and an inability to measure temperature changes below 1 K or transient temperatures over very short time scales.

BRIEF SUMMARY

A microscale thermocouple probe for intracellular temperature measurements comprises a cantilever structure including a suspended portion extending from a support, where the suspended portion includes first and second conductive lines on a surface thereof. The first and second conductive lines extend along the surface and meet at a tip of the suspended portion to define a thermocouple junction.

A method of measuring intracellular temperature includes inserting the tip of the microscale thermocouple probe described above, which may have any of the characteristics set forth in this disclosure, into a biological cell and measuring a temperature-dependent voltage generated at the thermocouple junction.

A method of making and calibrating a microscale thermocouple probe comprises: depositing an insulating film on a substrate; depositing and patterning a first conductive film to form a first conductive line on the insulating film; depositing and patterning a second conductive film to form a second conductive line on the insulating film, where the first and second conductive lines are adjacent to each other along a length of the insulating film and joined at ends thereof to define a thermocouple junction; calibrating the thermocouple junction; patterning the insulating film to define a tapered shape of the thermocouple probe; and etching the substrate under the insulating film to define a support and a suspended portion comprising the insulating film extending from the support, thereby forming a microscale thermocouple probe having a cantilever structure.

DETAILED DESCRIPTION

A thermocouple probe with a microscale tip and small thermal mass that is designed to be electrically and chemically inert to a cell's environment is described in this disclosure. This novel microscale thermocouple probe features a previously unattainable spatial resolution (≤5 μm) and response time (≤40 μs), which may enable transient thermometry of cell organelles. The thermocouple probe may be produced using techniques known from microelectromechanical systems (MEMS) fabrication. To reduce calibration errors, the thermocouple probe may be calibrated during fabrication using a new approach that avoids the inaccuracies associated with conventional water bath calibration. The microscale thermocouple probe and methods described in this disclosure may provide an avenue to thermometry at a subcellular level.

Figure 1:
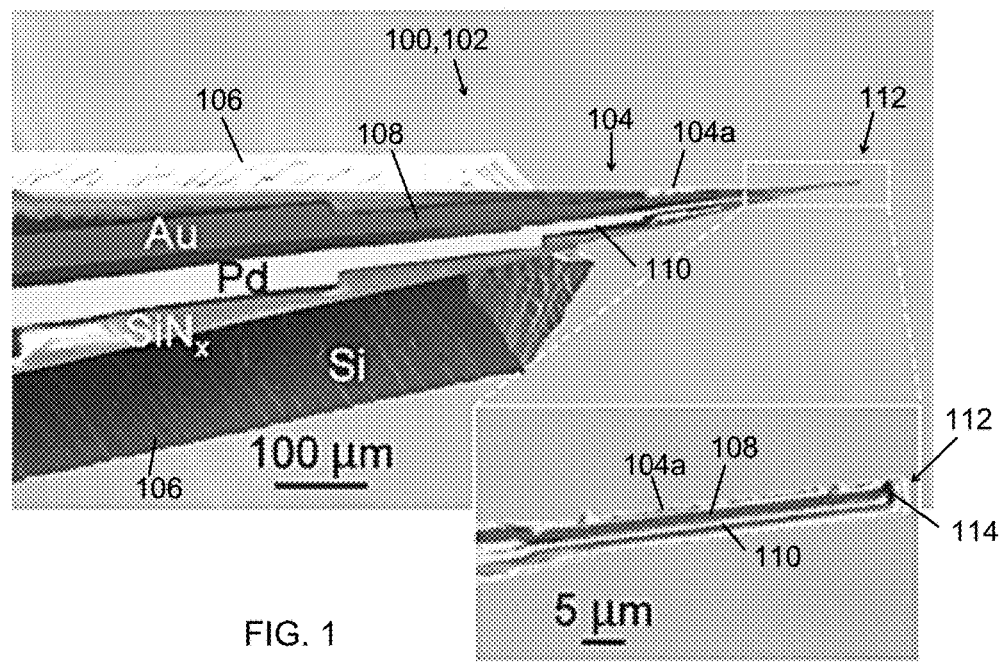
FIG. 1 shows scanning electron microscope (SEM) images of a portion of an exemplary fabricated microscale thermocouple probe having a cantilever structure; the inset image shows an enlarged view of the tip which includes the thermocouple junction.

Referring to FIG. 1, the microscale thermocouple probe 100 comprises a cantilever structure 102 including a suspended portion 104 extending from a support 106. The suspended portion 104 comprises first and second conductive lines 108,110 that extend along a surface 104a thereof and meet at a tip 112 of the suspended portion 104, thereby defining a thermocouple junction 114. The surface 104a may be a top surface of the cantilever structure 102 that faces away from the support 106. As can be seen in FIG. 2F, each of the first and second conductive lines 108,110 may extend from a contact pad 116 on the support 106 for making electrical contact with the thermocouple junction 114.

The suspended portion 104 advantageously comprises a thermally and electrically insulating material having a high Young's modulus or stiffness (e.g., at least about 30 GPa) and a low thermal conductivity (e.g., no greater than about 20 W/m·K). In addition to a high stiffness, the insulating material of the suspended portion 104 may comprise a compressive strength sufficient to overcome a cell wall's puncture stress, which may be about 1 MPa. Accordingly, the compressive strength may be at least about 10 MPa, or at least about 100 MPa. In some examples, the insulating material of the suspended portion 104 may be selected from silicon nitride, aluminum nitride, silicon carbide, silicon dioxide, silicon, polydimethylsiloxane (PDMS), polymethyl methacrylate (PMMA), and/or SU-8. Preferably, the material comprises silicon nitride, aluminum nitride, and/or silicon carbide.

Due to its high stiffness, the suspended portion 104 may extend a significant distance from the support 106, which may help to promote thermal isolation of the thermocouple junction 114 from the support 106. For example, the suspended portion 104 may extend at least about 400 μm from the support 106. During use for intracellular measurements, only the suspended portion 104 is intended to enter the cell. The suspended portion 104 may have a microscale or sub-microscale thickness along its length. For example, the thickness of the suspended portion 104 may be about 2 μm or less, preferably about 1 μm or less, and even more preferably about 750 nm (0.75 μm) or less along its length. Typically the thickness of the suspended portion 104 is at least about 500 nm. As shown in FIG. 2F, the thickness of the suspended portion 104 may also be substantially constant as a function of length (i.e., within ±100 nm, or within ±50 nm).

Typically, the support 106 for the suspended portion 104 comprises a material such as silicon, PDMS, sapphire, and/or a III-V semiconductor (e.g., GaAs). The support may have a thickness in a range from about 100 μm to about 1,000 μm (1 mm), or another suitable thickness. The support 106 employed in the examples in this disclosure has a thickness between about 100 μm to about 400 μm.

To ensure spatial resolution sufficient for intracellular measurements, the suspended portion 104 may taper in width along its length (in a direction of the tip 112), e.g., to a width at the tip 112 of about 5 μm or less. Preferably, the width at the tip 112 may be even smaller, such as about 3 μm or less. Due to its tapered shape, the suspended portion 104 may have a width immediately adjacent to the support 106 that is from about 10 times to about 100 times greater than the width at the tip 112. The thermocouple junction 114 defined by the junction of the first and second conductive lines 108,110, as shown in the inset of FIG. 1, may also have a sub-microscale width of about 1 μm or less, and preferably about 750 nm or less or about 500 nm or less. The suspended portion 104 and the first and second conductive lines 108, 110 may be fabricated by thin film deposition and patterning methods known in the art, as discussed further below.

The first and second conductive lines 108,110 and consequently the thermocouple junction 114 may comprise two different electrically conductive materials (e.g., metals and/or doped semiconductors). For example, suitable electrically conductive materials may be selected from Al, Au, Cr, Ir, Ni, Pt, Ti, Pd, W, p-doped Si, and/or n-doped Si. To be clear, the first conductive line 108 may comprise one electrically conductive material, such as one of the materials listed above, and the second conductive line 110 may comprise a different electrically conductive material, such as another of the materials listed above, to form the thermocouple junction 114 which includes both materials. In one example, where the thermocouple junction 114 comprises Au and Pd, first conductive line 108 may comprise Au (or Pd), and the second conductive line 110 may comprise Pd (or Au). Both of these conductive materials are compatible with the fabrication process described below; specifically, Au and Pd are resistant to KOH etching, which is beneficial when silicon is employed as the material for the support 106. In another example, when the thermocouple junction comprises Ni and Cr, the first conductive line 108 may comprise Ni (or Cr) and the second conductive line 110 may comprise Cr (or Ni). The combination of Ni and Cr is widely used for thermocouple probes.

Typically, the first and second conductive lines 108,110 may have a thickness of about 100 nm or less, such as a thickness in a range from about 50 nm to about 100 nm. If the thickness of the conductive lines 108,110 is too low, the sensitivity of the thermocouple probe 100 may be impaired. As is known in the art, the sensitivity of a thermocouple junction 114 made from metal A having a Seebeck coefficient $S_A$ and metal B having a Seebeck coefficient $S_B$ is given by the combined Seebeck coefficient:

$$S_{AB} = S_A - S_B$$

Accordingly, a thermocouple junction 114 comprising Au (assuming $S_{Au}$=1.94 µV/K at 300 K) and Pd (assuming $S_{Pd}$=−9.99 µV/K at 300 K) can be expected to have a sensitivity:

$$S = 1.94 - (-9.99) \frac{\mu V}{K} \approx 11.93 \; \mu V/K$$

Practically speaking, the microscale thermocouple probe may exhibit a sensitivity in a range from about 0.1 µV/K to about 500 µV/K, from about 1 µV/K to about 100 µV/K, and/or from about 5 µV/K to about 50 µV/K.

Referring now to FIGS. 2A-2F and 3A-3C, a method of fabricating and calibrating the microscale thermocouple probe 100 is described, first in general, and then with regard to a particular experimental example.

Figure 2A:
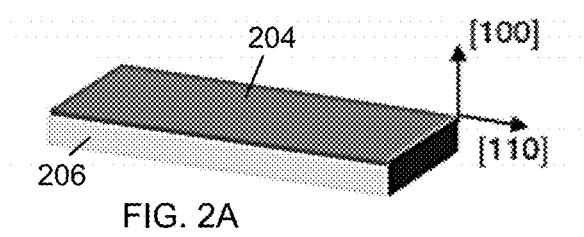
FIGS. 2A-2F show exemplary steps in fabrication of the microscale thermocouple probe, where calibration of the probe occurs prior to formation of the cantilever structure.

As shown in FIG. 2A, an insulating film 204 is deposited on a substrate 206, which may comprise silicon, PDMS, sapphire, and/or a III-V semiconductor such as GaAs. The substrate may have a thickness in a range from about 100 µm to about 1,000 µm (1 mm). For an example where the substrate is silicon, or more specifically single-crystal silicon, the substrate 206 may have the crystallographic orientation shown in FIG. 2A.

The insulating film 204, which is preferably electrically and thermally insulating, may comprise a material selected from silicon nitride, aluminum nitride, silicon carbide, silicon dioxide, silicon, polydimethylsiloxane (PDMS), polymethyl methacrylate (PMMA), and/or SU-8. Deposition of the insulating film 204 may comprise chemical vapor deposition (e.g., plasma enhanced chemical vapor deposition (PECVD)), physical vapor deposition (e.g., sputtering or electron beam evaporation), spin coating, dip coating, and spray coating, or another suitable deposition method. Typically, the insulating film 204 is deposited to a thickness of about 2 µm or less, preferably about 1 µm or less, and even more preferably about 750 nm (0.75 µm) or less. Typically the thickness is at least about 500 nm. Once patterning of the insulating film 204 and etching of the substrate 206 to release the cantilever structure 102 are complete, as described below in reference to FIGS. 2E and 2F, the insulating film 204 becomes the suspended portion 104 and the substrate 206 becomes the support 106.

Figure 2B:
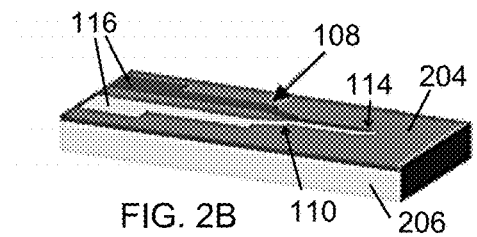

After deposition of the insulating film 204, a first conductive film may be deposited and patterned to form a first conductive line 108 on the insulating film 204, and a second conductive film may be deposited and patterned to form a second conductive line 110 on the insulating film 204. In addition, contact pads 116 electrically connected to the first and second conductive lines 108,110 are defined on the insulating film 204 for electrical connection to the thermocouple junction 114. As shown in FIG. 2B, the contact pads 116 may be formed on the portion of the substrate 206 that becomes the support 106 after etching. The first and second conductive lines 108,110 extend adjacent to each other from the contact pads 116 along a length of the insulating film 204, and are joined (only) at ends thereof to define the thermocouple junction 114. Depositing and patterning of the first and second conductive films may comprise one or more of the following techniques: vapor deposition (typically physical vapor deposition), photolithography (e.g., optical lithography, UV lithography, and/or extreme UV lithography), electron beam lithography, scanning probe lithography, stencil lithography, focused ion beam deposition, nanoimprinting, and 3D printing. Typically, the first and second conductive films are deposited to a thickness of about 100 nm or less, such as a thickness in a range from about 50 nm to about 100 nm.

Figure 2C:
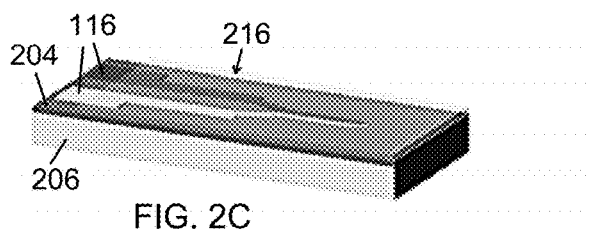

Referring to FIG. 2C, a protective coating 216 comprising a material such as silicon nitride (e.g., $SiN_x$) may be deposited before or after the calibration steps described below to protect the thermocouple junction 114 during subsequent processing steps (such as etching of the substrate 206). The protective coating 216 may overlie the conductive lines 108,110 and the insulating film 204.

Figure 2D:
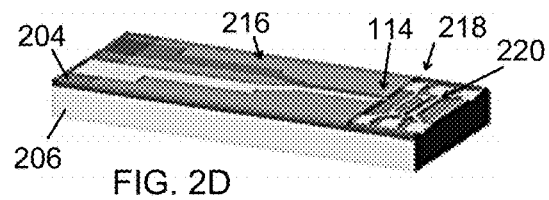
Figure 2E:
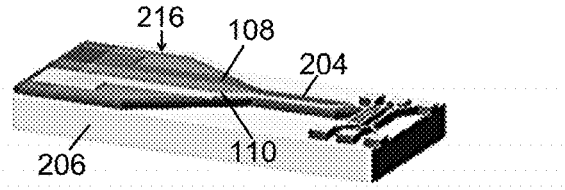
Figure 2F:
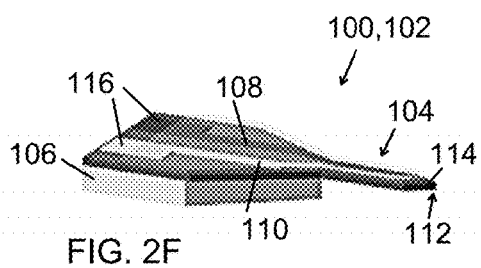
Figure 3A:
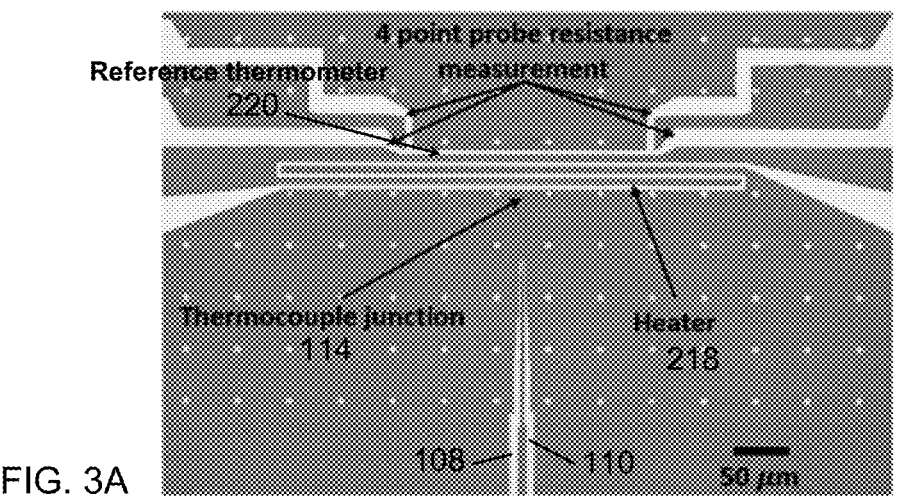
FIG. 3A shows an optical image of the calibration configuration, which includes a heating element disposed equidistant from a reference thermometer and the tip of the thermocouple probe (which in this example includes an Au/Pd thermocouple junction). The heating element (or "heater") and reference thermometer each comprise a thin-film resistor (a gold thin-film resistor in this example). Calibration of the thermocouple junction is typically carried out in a temperature-controlled cryostat under high vacuum conditions (e.g., $<10^{-6}$ bar).

The method further comprises, after depositing and patterning the first and second conductive films, depositing and patterning one or more additional conductive films to form a heating element 218 and a reference thermometer (thin-film resistor or "thermistor") 220, as shown in FIGS. 2D and 2E, and as shown in greater detail in FIG. 3A. Notably, the thermocouple junction 114 and the reference thermometer 220 are preferably positioned equidistant from and in close proximity to the heating element 218 on the insulating film 204 (e.g., within 10 µm). As with the first and second conductive films, depositing and patterning of the additional conductive film(s) may comprise one or more of the following techniques: vapor deposition (typically physical vapor deposition), photolithography (e.g., optical lithography, UV lithography, and/or extreme UV lithography), electron beam lithography, scanning probe lithography, stencil lithography, focused ion beam deposition, nanoimprinting, and 3D printing. Typically, the additional conductive film(s) are deposited to a thickness of about 500 nm or less or about 300 nm or less, and the thickness is typically at least about 50 nm. The additional conductive film(s) may comprise any of the conductive materials referred to above, such as Au or Pd.

Referring now to FIG. 3A, the thermocouple junction 114 is calibrated on-chip during fabrication, and more specifically prior to etching the substrate to form the cantilever structure 102. The calibration may be carried out under vacuum conditions, preferably in a high vacuum of about $10^{-6}$ bar or less. The close proximity of the thermocouple junction 114 and reference thermometer 220 to the heating element 218 and the vacuum conditions employed during calibration help to ensure that heat conduction is the dominant heat transfer mechanism. Therefore, this calibration approach minimizes local convection currents, and provides an accurate calibration of both the reference thermometer 218 and the thermocouple junction 114. As discussed below, the accuracy of the temperature measurements may be ±54 mK for 300±10 K.

Figure 3B:
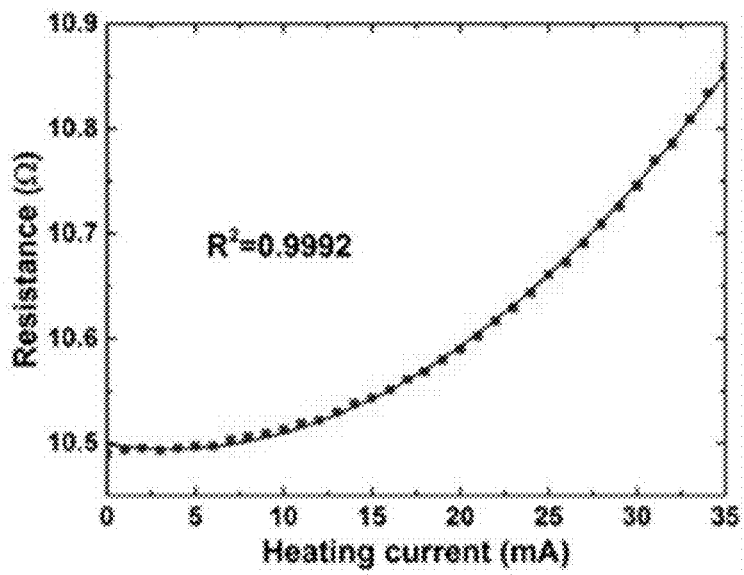
FIGS. 3B and 3C show calibration data, including: the resistance of the reference thermometer plotted against heating current (FIG. 3B), where the data points fit well to a quadratic curve with a coefficient of determination ($R^2$) of 0.9992; and Seebeck voltage across the exemplary Au/Pd thermocouple junction as its temperature is increased by the heater (FIG. 3B). The temperature at the thermocouple junction is assumed to be the same as the reference thermometer. The Seebeck coefficient of the thermocouple junction is the slope of a straight line fit to the data points.
Figure 3C:
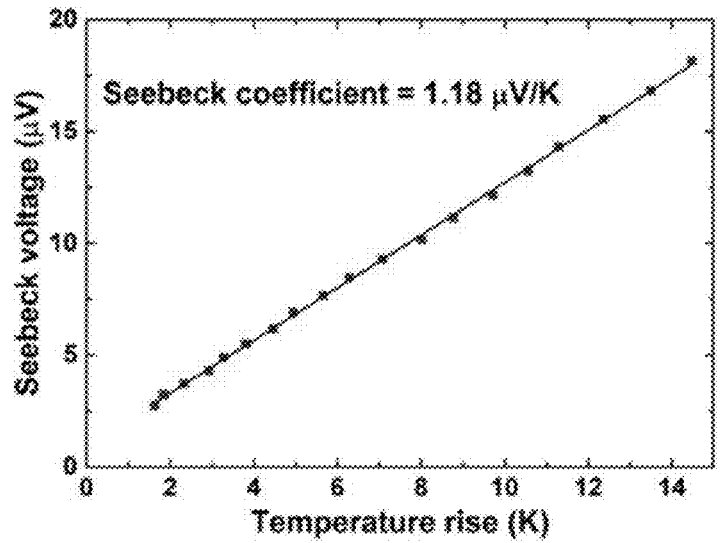

The calibration may comprise a two-step process, where the reference thermometer 220 is calibrated first by heating the entire substrate 206 under vacuum conditions as described above (e.g., in a vacuum cryostat) to different known temperatures and determining the corresponding resistance of the reference thermometer 220. Exemplary resistance data from an example described below are shown in FIG. 3B. Once the reference thermometer 220 is calibrated, the heating element 218 is resistively heated, also under vacuum conditions, and the temperature to which the thermocouple junction 114 is exposed may be determined from the measured resistance of the reference thermometer 220. Thus, the voltage generated by the thermocouple junction 114 may be plotted versus the temperature of the reference thermocouple 220, as shown in FIG. 3C based on an example described in greater detail below.

Typically after calibration, the insulating film 204 is patterned to define a tapered shape of the tip 112 of the thermocouple probe 100, as shown in FIG. 2E, and to expose the substrate 206. The patterning may comprise photolithography and reactive ion etching, or another suitable patterning technique. For example, a photoresist may be patterned to the desired tapered shape of the thermocouple probe 100, and, using the photoresist as a mask, the insulating film 204 may be etched until the substrate 206 is exposed. Finally, as illustrated in FIG. 2F, the substrate 206 under the insulating film 204 may be etched to define the suspended portion 104 and the support 106 for the cantilever structure 102, thereby forming the microscale thermocouple probe 100. The etching of the substrate 206 may comprise wet etching, deep reactive ion etching, or another suitable etching technique.

Figure 4A:
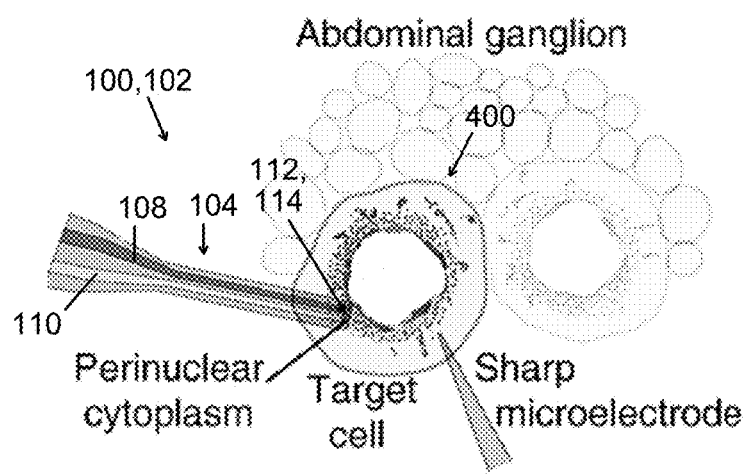
FIG. 4A is a schematic of a set-up for measuring temperature changes inside a cell using the microscale thermocouple probe of FIG. 1 while an additional sharp microelectrode is used to measure membrane potential.
Figure 4B:
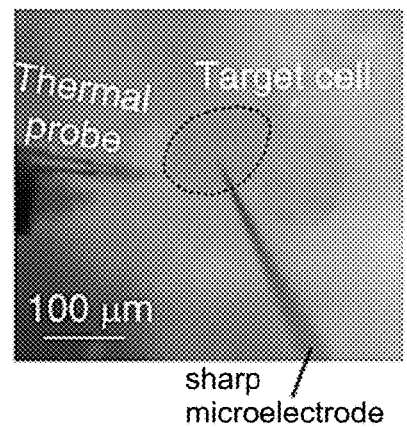
FIG. 4B shows an optical image of the thermocouple probe and microelectrode shown schematically in FIG. 4A inside a cell (abdominal ganglion of Aplysia) for temperature and membrane potential measurements, where the scale bar represents 100 µm.

FIGS. 4A and 4B show a method of measuring intracellular temperature. The method comprises inserting the tip 112 of the microscale thermocouple probe 100 according to any embodiment in this disclosure into a targeted biological cell 400, and measuring a temperature-dependent voltage generated at the thermocouple junction 114. In order to measure the temperature-dependent voltage, a voltmeter may be electrically connected to the first and second conductive lines 108,110 at the contact pads 116 disposed on the support 106 (and shown in FIG. 2F). The temperature-dependent voltage may be converted to temperature using previously-obtained calibration data. As discussed below, the thermocouple junction 114 may exhibit a thermal response time of about 40 µs or less, e.g., as fast as about 32 µs, or even faster.

Examples

Described below are the design and fabrication of an exemplary microscale thermocouple probe for measuring intracellular temperature changes in vitro. The thermocouple probe exhibits a thermal time constant as small as 32 µs, and the thermocouple junction size (e.g., width or diameter) of about 1 µm or less offers spatial resolution sufficient for intracellular measurements. A water bath is not employed for calibration, and instead an on-chip calibration process is employed as described above to calibrate the thermocouple junction during fabrication. It is demonstrated that the calibration error can be reduced to be comparable to the noise floor. The fabrication process allows for batch fabrication, making it possible to produce multiple probes (e.g., 16 in this example) from a single substrate (e.g., from a 4 in. semiconductor wafer as described below).

Fabrication

Starting from a double-side polished (100) silicon wafer 206 that is p-doped to a resistivity of 10-20 Ωcm, as shown in FIG. 2A, a stress-free, 1 µm-thick silicon nitride insulating film 204 is deposited on the silicon wafer using plasma enhanced chemical vapor deposition (PECVD) with a STS Mesc Multiplex PECVD operated at a mix of 13.56 MHz and 380 kHz. The silicon nitride insulating layer 204 forms the material for the suspended portion that eventually supports the conductive lines that meet to form the thermocouple junction. Silicon nitride is used as the insulating film 204 for this example since it provides excellent thermal isolation of the thermocouple junction from the support or base of the cantilever structure, and is also an electrical insulator. Its compression strength of about 600 MPa with a Young's modulus of about 152 GPa enable the suspended portion to easily overcome a cell wall's puncture stress of about 1 MPa.

Referring now to FIG. 2B, electron beam metal evaporation (Temescal FC-2000 deposition system) is used to deposit 70 nm thick, 400 nm wide gold (Au) and palladium (Pd) conductive films on top of the 1 µm thick silicon nitride layer. The conductive films are defined using a combination of UV photolithography (Karl Suss MJB3) and electron beam lithography (Raith eLine) to the dimensions of the conductive lines 108,110 and thermocouple junction 114. Gold and palladium are suitable materials for the thermocouple since both materials are resistant to KOH etching, which is subsequently used in this example to release the cantilever structure.

Following the deposition of the conductive metal films for the thermocouple, additional 300 nm thick metal films are deposited to form the heating element (or "heater") 218 and reference thermometer 220 for calibrating the thermocouple junction 114, as shown in FIG. 2D. The reference thermometer 220 and thermocouple junction 114 are both 6 µm away from the heater 218 in this example. The thermocouple junction 114 is calibrated prior to releasing the probe from the wafer (as shown in FIG. 2F). Before or after calibration, a 200 nm thick PECVD silicon nitride protective layer is deposited on top of $Si/SiN_x$/metal-junction to protect the thermocouple junction. This protective layer 216, shown as a translucent layer in FIG. 2C, protects a chrome adhesion layer underlying the conductive metal lines from aqueous KOH etching. Part of the protective nitride layer 216 may be etched away carefully to expose the contact pads 116 for electrical connections.

A photoresist is patterned to the desired shape of the probe. Using the photoresist as a mask, the insulating film 204 is etched using reactive ion etching (PlasmaLab systems Freon RIE) until the substrate 206 is exposed. Multiple RIE steps may be performed until a profile such as the one shown in FIG. 2E is obtained. The metal electrodes that are used for calibration may be unaffected by RIE. However, they are removed in the subsequent step.

The design of the metal lines and the patterning of the insulating film 204 ensure that the tip 112 is oriented along [110]. The tip 112 that extends along [110] has a convex edge over the silicon substrate 204. These features collectively enhance the etch rate of silicon under the tip when aqueous KOH is used. Bulk silicon etching is performed using 45% aq. KOH at 80° C. bath temperature. The samples are held by clamps for about 40-50 min while etching. By the end of the etch process, a suspended portion 104 having a length about 451 microns is formed, as shown in FIG. 2F. The silicon support 106 visible underneath the insulating film 204 has (111) planes exposed everywhere.

FIG. 1 shows an SEM image of the fabricated thermocouple probe 100. Since silicon nitride is a poor thermal conductor, the suspended portion 104 isolates the tip 112 from temperature fluctuations in the silicon support 106, and therefore from the external surroundings. During intracellular thermometry, only the suspended portion 104 is expected to enter the cell, which enhances the thermal isolation. Electrical continuity of the thermocouple probe 100 after fabrication of the suspended portion 104 is verified by measuring the resistance of the thermocouple junction 114 before and after etching.

Calibration

In previous work, thermocouples for cellular thermometry were calibrated in a water bath. However, as discussed above, this can lead to significant error due to convection effects in calibration for a probe meant to measure 500 mK changes. Here, this issue is avoided through an in situ calibration process that follows the formation of conductive metal lines as shown in FIG. 2B, and prior to etching the bulk silicon, as shown in FIG. 2F. The calibration may be done in a vacuum cryostat using a heater 218 and a reference thermometer (thin-film resistor or thermistor) 220 on-chip, as shown in FIG. 3A. The serpentine heating element 218 is 6 μm away from both the thermocouple junction 114 and the reference thermometer 220.

The calibration is a two-step process, as described above. In this example, the reference thermometer 220 is first calibrated in a vacuum cryostat; the thermocouple junction 114 is then calibrated in the second step using the calibrated thermometer 220. In the first step, the temperature coefficient of resistance (TCR) of the thermistor 220 is calibrated by measuring changes in electrical resistance at different bath temperatures of the cryostat. The bath temperature of the cryostat has an accuracy of 1 mK. The electrical resistance of the thermistor 220 is measured using a 4-point probe method with two SR830 lock-in amplifiers. In the second step, a Keithley DC current source provides current to the serpentine heating element 218 equidistant from the thermistor 220 and the thermocouple junction 114, as shown in FIG. 3A. As a first approximation, the temperature rise at the thermocouple junction 114 and the thermistor 220 respectively can be assumed to be the same. The validity of this assumption is confirmed later. A Keithley nanovoltmeter measures the potential difference across the thermocouple junction 114. The change in resistance at the thermistor 220 increases quadratically with the current at the heating element 218, confirming that the resistance change is indeed due to increased temperatures. FIG. 3B shows the resistance change with DC heating current for this example.

The Seebeck coefficient of the thermocouple junction 114 is obtained by fitting a straight line between the potential difference measured at the thermocouple junction 114 and the temperature rise measured at the thermistor 220, as shown in FIG. 3C for this example. A Seebeck coefficient of 1.18 μV/K is obtained for the Au/Pd thermocouple junction. The estimated error in the slope is 7.34 nV/K. This calibration process is performed on each thermocouple probe 100 that is fabricated. The Seebeck coefficient is found to vary within the range 0.8-1.3 μV/K over the wafer.

Figure 5:
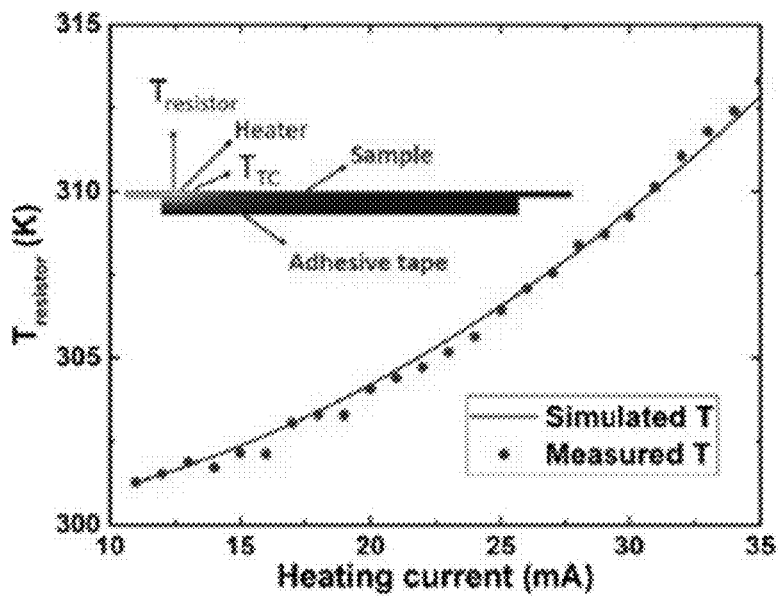
FIG. 5 shows simulated temperature rise at the thin-film resistor employed as a reference thermometer ($T_{resistor}$) compared against measurements for increasing current at the heater. $T_{resistor}$ is obtained from 4-point probe resistance measurements and the TCR of the thin-film resistor, where $T_{cryostat}=300$ K, and the inset shows the geometry used for the simulation.

A subtle issue in the calibration arises from the fact that the temperatures at the thermocouple junction 114 and the thin-film resistor 220 may not be identical due to asymmetry. To investigate this issue, finite element simulations of the calibration process in COMSOL are performed to understand whether the asymmetry introduces a significant calibration error. The inset of FIG. 5 shows the geometry of the model. The serpentine heating element produces a temperature distribution that is symmetric along a (110) plane parallel to the length of the probe that bisects the heater and thin-film resistor lines. For numerical simulations, this symmetry is utilized to model a 2D cross-section of the sample along the symmetry plane. While calibrating the sample in a vacuum cryostat, the sample is fixed to adhesive tape on a chip holder. The exposed sides of the adhesive tape and the sample are the outer boundaries of this geometry. The cryostat's bath temperature ($T_{cryostat}$) yields the boundary condition at the bottom of the system. Adiabatic boundary conditions apply elsewhere since the system is in vacuum. The heater line (heating element) is modeled as a constant heat source whose magnitude is equal to that of the heating power used in the measurements. The thermal properties of the materials are taken from the literature: $k_{Au\ film}$=225 W/mK, $k_{SiNx}$=0.8 W/mK, $k_{Si}$=126.8 W/mK, and $k_{tape}$=1.4 W/mK. The thermal contact resistance between the thin films ($SiN_x$/Si, Au/Cr/$SiN_x$) is on the order of $10^{-8}$ m² K/W and is insignificant compared to the resistance of the adhesive tape ($\sim 10^{-3}$ m² K/W) itself. The contact resistance on either side of the adhesive tape is also assumed to be negligible.

The temperature rise at the thin-film resistor estimated from simulations is compared in FIG. 5 against the measurements as a validation step. The simulated rise closely follows the measured values with a maximum deviation of 0.63% at the highest heating current. This confirms that the thermal properties and boundary conditions used in the simulation adequately represent the calibration setup. Using this validated model, the temperature differences between the thermocouple junction (or thermocouple tip) ($T_{TC}$) and the thin-film resistor ($T_{resistor}$) during calibration are estimated.

Figure 6:
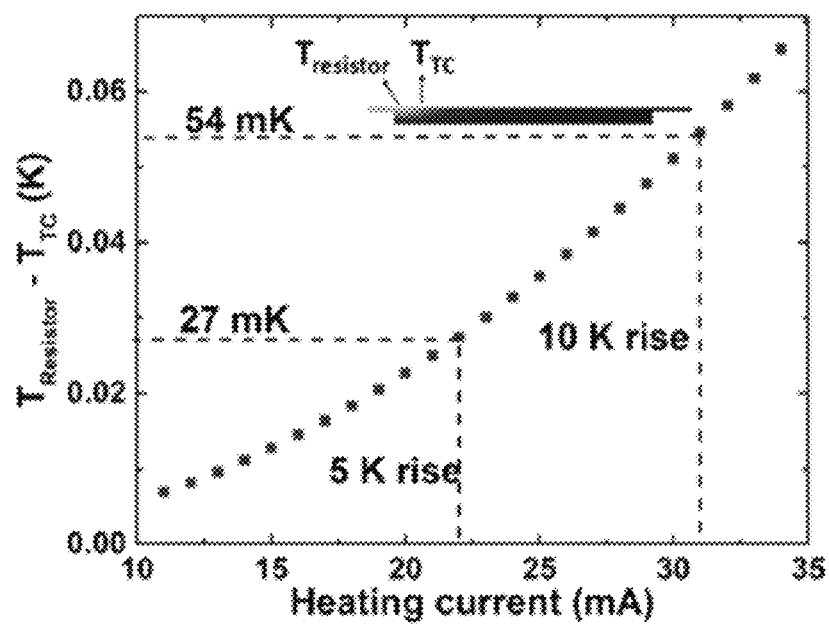
FIG. 6 shows the temperature difference between the thermocouple tip and the thin-film resistor (reference thermometer) calculated at different heating currents. A heating current of about 31 mA is estimated to produce a 10 K rise at the thin-film resistor. The error due to assuming symmetricity is 54 mK when the measured temperature rise from ambient ($T_{cryostat}=300$ K) is 10 K.

FIG. 6 shows the difference in temperature between the thin-film resistor and the thermocouple junction at different heating currents. The bath temperature of the cryostat is fixed at $T_{cryostat}$=300 K in these calculations. For a 10 K rise in temperature at the junction, the error in calibration is found to be 54 mK. The error decreases to 27 mK for a 5 K rise from $T_{cryostat}$. The simulations help to determine the maximum heating current to be used in calibration for a desired accuracy. For operating at 300±10 K, the accuracy of calibration is ±54 mK. This figure is about two orders of magnitude larger than the apparent temperature resolution of 0.85 mK possible with the probe when using a nanovoltmeter with 1 nV resolution. Further, it is shown experimentally that the noise floor is comparable to this calibration error. Hence, the calibration approach described here helps to reduce the overall measurement uncertainty to approach the noise floor.

Thermal Response

Figure 7:
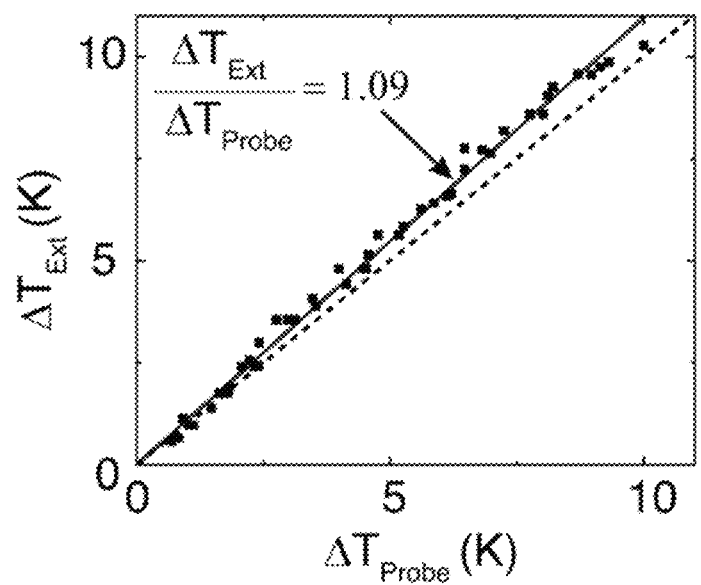
FIG. 7 shows data from measurements to confirm the temperature response using the microscale temperature probe in a heated culture medium.

The microscale thermocouple probe is tested in a heated culture medium to confirm the temperature response. Using a heated microscopy stage, temperature changes are measured with the probe ($\Delta T_{Probe}$) placed inside a neuron of buccal ganglion and with an external thermistor ($\Delta T_{Ext}$) placed in a saline bath about 1 cm away from the ganglion. In this example, an omega thermistor (TH-44032-40-T) is used in conjunction with a recording device (Measurement Computing USB-TEMP) to measure $\Delta T_{Ext}$. The culture dish is heated by 10 K over a period of 1 hour in steps of 2-3 K. The Seebeck voltage from the microthermal probe yields $\Delta T_{Probe}$, using a prior calibration. The bath's temperature rise ($\Delta T_{Ext}$) is obtained from the external thermistor. The measurements are repeated three times with different step sizes; all data points are shown in FIG. 7. The solid line is a linear fit to the measured data, whereas the dashed line corresponds to a slope of 1. The temperature measurement from the external thermistor is different from the microthermal probe's reading by ~9.5%. The difference, in magnitude, is as large as ~300 mK at the largest temperature rise of ~10 K. This difference may be attributed to arise from convection currents inside the bath.

Figure 8:
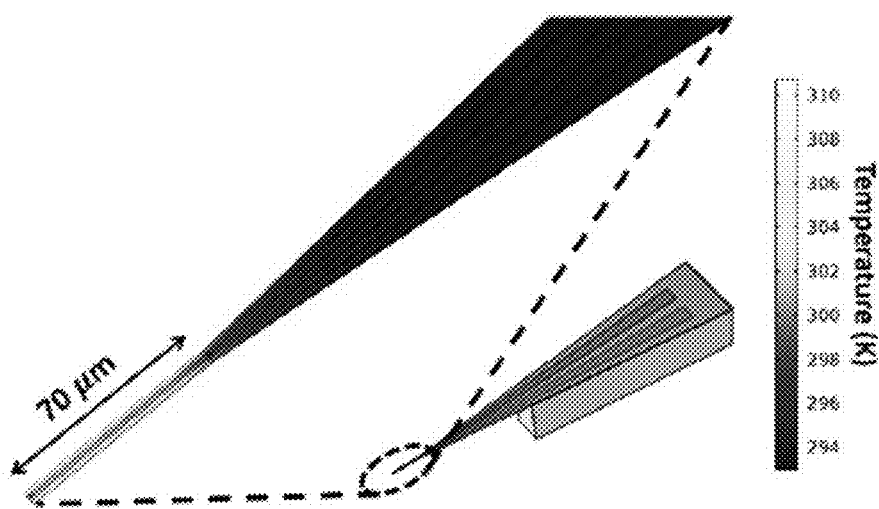
FIG. 8 shows a simulated temperature contour of an exemplary thermocouple probe tip at t=5 μs. An initial temperature of 313 K is applied to the tip while the ambient temperature is at 293 K.

Typical thermal time constants of action potential pulses in neuron cells range from 4 to 100 ms. To reliably measure stimuli at such time scales, the thermal time constant of the sensor is designed to be at least an order of magnitude lower. Here, numerical simulations in COMSOL to obtain the value are reported. The geometry of the simulation is shown in the inset of FIG. 8. In this case, the symmetry plane previously defined is no longer a plane of symmetry since the width of the thermocouple probe gradually increases along the plane.

Therefore, the validated simulation model is extended to model a 3D geometry that resembles the probe described herein. The 70 μm long probe tip is initially given a temperature of 313 K at t=0 s. It is assumed to cool in water at 293 K for t>0, and the time it takes to reach ambient conditions (293 K) is calculated. A natural convection boundary condition is applied to all the exposed surfaces except for the 70 μm tip region. A convection coefficient of 50 W/m² K corresponding to natural convection in water is used. The convection coefficient along the microscale tip structure is typically much larger than at large scales. So, for the outer surfaces of the tip, a heat conduction boundary condition known to be appropriate for microfabricated structures is employed. The specific heat capacity of the materials used in the model are taken from the literature: $C_{Metal\ film}$=0.3 J/kg K, $C_{SiNx}$=370 J/kg K, and $C_{Si}$=672 J/kg K. Other required material properties are the same as discussed above.

Figure 9:
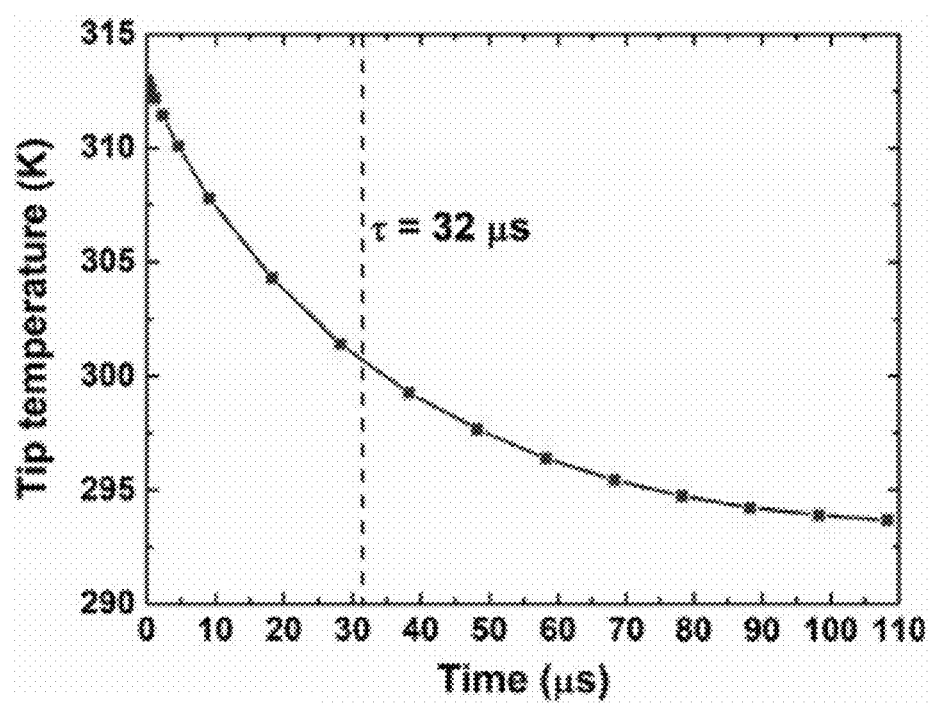
FIG. 9 shows simulated tip temperatures plotted against time as the thermocouple probe cools down in water. An exponential line fit to the simulated data points is used to obtain the thermal time constant of the probe.

A transient three-dimensional heat conduction equation is solved using the finite element method. A snapshot of the temperature profile at t=5 μs is shown in FIG. 8. The temperature at the thermocouple tip over time is calculated as shown in FIG. 9. The thermal time constant of the probe is the time taken to change the temperature by a factor of 1/e. From FIG. 9, the value is 32 μs, which is comparable to and better than the time constants of existing microscale thermal probes. The material and the small length scales of the microscale thermocouple probe described in this disclosure thus make it possible to have a thermal response time that is a few orders of magnitude smaller than the stimuli in a typical neuron cell.

Although the present invention has been described in considerable detail with reference to certain embodiments thereof, other embodiments are possible without departing from the present invention. The spirit and scope of the appended claims should not be limited, therefore, to the description of the preferred embodiments contained herein. All embodiments that come within the meaning of the claims, either literally or by equivalence, are intended to be embraced therein.

Furthermore, the advantages described above are not necessarily the only advantages of the invention, and it is not necessarily expected that all of the described advantages will be achieved with every embodiment of the invention.

The invention claimed is:

1. A microscale thermocouple probe for intracellular temperature measurements, the probe comprising:
    a cantilever structure comprising a suspended portion extending from a support, the suspended portion comprising:
        first and second conductive lines on a surface thereof, the first and second conductive lines extending along the surface and meeting at a tip of the suspended portion to define a thermocouple junction of the microscale thermocouple probe for intracellular temperature measurements,
        wherein a thickness of the suspended portion is substantially constant over a total length of the suspended portion, the thickness varying within +/−100 nm over the total length.

2. The microscale thermocouple probe of claim 1, wherein the tip of the suspended portion has a width of about 5 μm or less.

3. The microscale thermocouple probe of claim 1, wherein the thermocouple junction has a width of about 1 μm or less.

4. The microscale thermocouple probe of claim 1, wherein the suspended portion has a thickness of about 1 μm or less.

5. The microscale thermocouple probe of claim 1, wherein the suspended portion extends at least about 400 μm from the support.

6. The microscale thermocouple probe of claim 1, wherein the surface is a top surface of the cantilever structure, and
    wherein each of the first and second conductive lines extends from a contact pad on the support for making electrical contact with the thermocouple junction.

7. The microscale thermocouple probe of claim 1, wherein the suspended portion comprises an insulating material selected from the group consisting of: silicon nitride, aluminum nitride, silicon carbide, silicon dioxide, silicon, polydimethylsiloxane (PDMS), polymethyl methacrylate (PMMA), and SU-8.

8. The microscale thermocouple probe of claim 1, wherein the suspended portion comprises an insulating material having a Young's modulus of at least about 30 GPa and a thermal conductivity of no greater than about 20 W/m·K.

9. The microscale thermocouple probe of claim 1, wherein the first and second conductive lines comprise two different materials selected from the group consisting of: Al, Au, Cr, Ir, Ni, Pt, Ti, Pd, W, p-doped Si, and n-doped Si.

10. The microscale thermocouple probe of claim 1, wherein the first and second conductive lines comprise a thickness of about 100 nm or less.

11. The microscale thermocouple probe of claim 1, wherein the support comprises a material selected from the group consisting of: silicon, PDMS, sapphire, and a III-V semiconductor.

12. A method of measuring intracellular temperature, the method comprising:
    inserting the tip of the microscale thermocouple probe of claim 1 into a biological cell; and
    measuring a temperature-dependent voltage generated at the thermocouple junction.

13. The method of claim 12, wherein measuring the temperature-dependent voltage comprises electrically connecting a voltmeter to the first and second conductive lines at contact pads disposed on the support.

14. The method of claim 1, wherein the thermocouple junction exhibits a thermal response time of about 40 μs or less.

15. A method of making and calibrating a microscale thermocouple probe, the method comprising:
    depositing an insulating film on a substrate;
    depositing and patterning a first conductive film to form a first conductive line on the insulating film;
    depositing and patterning a second conductive film to form a second conductive line on the insulating film, the first and second conductive lines being adjacent to each other along a length of the insulating film and being joined at ends thereof to define a thermocouple junction;
    depositing and patterning one or more additional conductive films to form a heating element and a reference thermometer on the insulating film, the thermocouple junction and the reference thermometer being equidistant from the heating element; and
    calibrating the reference thermometer and the thermocouple junction;
    patterning the insulating film to define a tapered shape of the microscale thermocouple probe; and etching the substrate under the insulating film to define a support and a suspended portion comprising the insulating film extending from the support, thereby forming the microscale thermocouple probe having a cantilever structure, the heating element and the reference thermometer being removed during etching.

16. The method of claim 15, wherein the thermocouple junction exhibits a calibration accuracy of ±54 mK.

17. The method of claim 15, wherein the depositing the insulating film comprises a deposition method selected from chemical vapor deposition, physical vapor deposition, spin coating, dip coating, and spray coating.

18. The method of claim 15, wherein patterning the insulating film comprises photolithography and reactive ion etching.

19. The method of claim 15, wherein depositing and patterning the first and second conductive films comprises one or more the following techniques: physical vapor deposition, photolithography, electron beam lithography, extreme UV photolithography, scanning probe lithography, stencil lithography, focused ion beam deposition, nanoimprinting, and 3D printing.

20. A method of measuring intracellular temperature, the method comprising:
   inserting a tip of a microscale thermocouple probe into a biological cell, the microscale thermocouple probe comprising:
     a cantilever structure comprising a suspended portion extending from a support, the suspended portion comprising: first and second conductive lines on a surface thereof, the first and second conductive lines extending along the surface and meeting at a tip of the suspended portion to define a thermocouple junction of the microscale thermocouple probe; and
   measuring a temperature-dependent voltage generated at the thermocouple junction, wherein the temperature-dependent voltage is indicative of the measured intracellular temperature.

* * * * *